(12) United States Patent
Makhani (10) Patent No.: US 10,387,509 B2
(45) Date of Patent: Aug. 20, 2019

(54) BEHAVIOR INFLUENCED SEARCH RANKING

(71) Applicant: Microsoft Technology Licensing, LLC, Redmond, WA (US)

(72) Inventor: Asif Mansoor Ali Makhani, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 14/581,159

(22) Filed: Dec. 23, 2014

(65) Prior Publication Data

US 2016/0034586 A1 Feb. 4, 2016

Related U.S. Application Data

(60) Provisional application No. 62/031,085, filed on Jul. 30, 2014.

(51) Int. Cl.
*G06F 16/00* (2019.01)
*G06F 16/9535* (2019.01)
(Continued)

(52) U.S. Cl.
CPC .... *G06F 16/9535* (2019.01); *G06F 16/24578* (2019.01); *G06Q 10/1053* (2013.01); *G06Q 50/01* (2013.01)

(58) Field of Classification Search
None
See application file for complete search history.

(56) References Cited

U.S. PATENT DOCUMENTS 8,086,605 B2 * 12/2011 Xu .................. G06F 17/30616
707/732
8,572,094 B2 * 10/2013 Luo .................... G06Q 10/10
707/748
(Continued)

FOREIGN PATENT DOCUMENTS

WO WO-2016018467 A1 2/2016

OTHER PUBLICATIONS

"International Application Serial No. PCT/US2015/021989, International Search Report dated Jun. 22, 2015", 3 pgs.
(Continued)

*Primary Examiner* — Belix M Ortiz Ditren
(74) *Attorney, Agent, or Firm* — Schwegman Lundberg & Woessner, P.A.

(57) ABSTRACT

A system and method for behavior influenced search ranking may include obtaining, via a network interface, a search term from a user device. An initial result including a first group of the user profiles may be generated based on user profiles from a social network in relation to the search term, the user profiles stored in a profile database. A rank of each of the first group of the user profiles may be determined based, at least in part, on interactions from an activity database corresponding to the first group of the user profiles, the activity database storing information indicative of activities related to the social network, the activities including the interactions. The user device may display a second group of the user profiles, including at least some of the first group of the user profiles, according to the rank of the first group of the user profiles.

20 Claims, 6 Drawing Sheets

(51) Int. Cl.
 G06F 16/2457 (2019.01)
 G06Q 10/10 (2012.01)
 G06Q 50/00 (2012.01)

(56) References Cited

U.S. PATENT DOCUMENTS

| | | | | |
|---|---|---|---|---|
| 8,972,368 | B1* | 3/2015 | de Sousa | G06F 17/30477 707/705 |
| 9,020,965 | B1* | 4/2015 | Sehrer | G06F 17/3053 707/758 |
| 2012/0059820 | A1* | 3/2012 | Lakshmanan | G06F 17/30867 707/723 |
| 2012/0166530 | A1* | 6/2012 | Tseng | G06Q 30/0255 709/204 |
| 2013/0282713 | A1* | 10/2013 | Lawrence | G06F 17/30867 707/732 |
| 2014/0129552 | A1* | 5/2014 | Sinha | G06Q 50/01 707/724 |
| 2015/0019273 | A1* | 1/2015 | Grosz | G06Q 10/02 705/5 |
| 2017/0093962 | A1* | 3/2017 | Player | H04L 41/20 |

OTHER PUBLICATIONS

"International Application Serial No. PCT/US2015/021989, Written Opinion dated Jun. 22, 2015", 6 pgs.
"International Application Serial No. PCT/US2015/021989, International Preliminary Report on Patentability dated Feb. 9, 2017", 8 pgs.

* cited by examiner

BEHAVIOR INFLUENCED SEARCH RANKING

PRIORITY

This application claims the benefit of priority to U.S. Provisional Patent Application No. 62/031,085, filed Jul. 30, 2014, "BEHAVIOR INFLUENCED SEARCH AND TRENDS", which is incorporated herein by reference in its entirety.

TECHNICAL FIELD

The subject matter disclosed herein generally relates to the use of user behavior in influencing search results.

BACKGROUND

Online search engines conventionally utilize factors such as keywords, the density of links to a website or content item, and sponsorship to variously rank, organize, and/or display search results. Thus, a website or content item that has a relatively large number of keyword matches as well as a relatively large number of other websites that link thereto may be positioned on a list of search results ahead of a website that has relatively fewer keyword matches or relatively fewer links thereto. The use of sponsorship of a link may be utilized to adjust results or prioritize particular links.

BRIEF DESCRIPTION OF THE DRAWINGS

Some embodiments are illustrated by way of example and not limitation in the figures of the accompanying drawings.

DETAILED DESCRIPTION

Example methods and systems are directed to the use of user behavior in influencing search results. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Conventional web searches may lack sensitivity to various aspects of what searchers do after the results are displayed. The behavior of searchers upon being presented with links to webpages or content items may provide insight into the value of the search results. For instance, if a searcher is presented with a list of search results and selects the sixth web link on the list it may be inferred that the searcher considered the sixth link to be the most valuable or potentially valuable result. If the search engine had ordered the results with what the search engine considered the likely most valuable link first on the list and then in descending order, it may be inferred that the search engine was wrong in the ordering. Similarly, if a searcher clicks on the first link of such an ordered list, it may be inferred that the search engine accurately identified the most valuable result.

Additional factors may be considered, such as interaction with a content item after display and initial selection. If a search is for job applicants by a recruiter then resultant interactions by the recruiter with the applicant may be considered. Thus, a search result may be scored more highly the recruiter first accesses the applicant's listing, and more highly if the recruiter then contacts the applicant, and more highly if the recruiter asks the applicant to interview, and so forth.

A search engine has been developed that factors in user behavior in the ordering and/or presentation of search results. Search terms may be given a score based on a variety of user behavior factors as well as the value of the data of the item being searched. Thus, in addition to conventional factors, such as keywords and the density of links to a website or content item, interactions with the search result and the reputation of searchers who are interacting with the search results may also be utilized in the determination of the score. Future searches that are related to those search terms may be modified accordingly according to the developed score.

Figure 1:
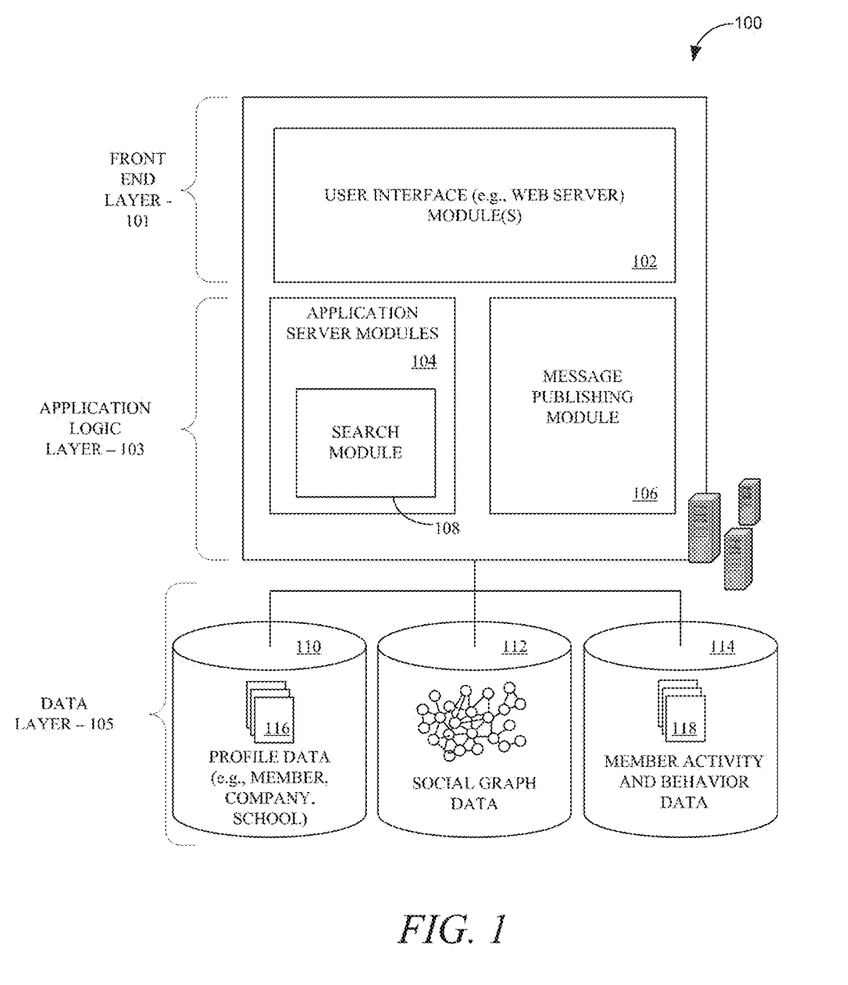
FIG. 1 is a block diagram illustrating various components or functional modules of a social network, in an example embodiment.

FIG. 1 is a block diagram illustrating various components or functional modules of a social network 100, consistent with some examples. The social network 100 may be utilized to provide treaded electronic messages within the user interface of the social network 100. While the threading of electronic messages are described with particular respect to the social network 100, it is to be recognized and understood that the principles described with respect to threaded electronic messages may be applied to any of a variety of platforms and electronic messages beyond those directly applicable to a social network generally.

A front end 101 consists of a user interface module (e.g., a web server) 102, which receives requests from various client-computing devices, and communicates appropriate responses to the requesting client devices. For example, the user interface module(s) 102 may receive requests in the form of Hypertext Transport Protocol (HTTP) requests, or other web-based, application programming interface (API) requests. An application logic layer 103 includes various application server modules 104, which, in conjunction with the user interface module(s) 102, may generate various user interfaces (e.g., web pages, applications, etc.) with data retrieved from various data sources in a data layer 105. In some examples, individual application server modules 104 may be used to implement the functionality associated with various services and features of the social network service. For instance, the ability of an organization to establish a presence in the social graph of the social network 100, including the ability to establish a customized web page on behalf of an organization, and to publish messages or status updates on behalf of an organization, may be services implemented in independent application server modules 104. Similarly, a variety of other applications or services that are made available to members of the social network service may be embodied in their own application server modules 104. Alternatively, various applications may be embodied in a single application server module 104. In some examples, the social network 100 includes a content item publishing module 106, such as may be utilized to receive content, such as electronic messages, posts, links, images, videos, and the like, and publish the content to the social network.

One or more of the application server modules 104, the content item publishing module 106, or the social network 100 generally may include a search module 108. As will be disclosed in detail herein, the search module 108 may identify websites or content items for display based on a search term as entered by a searcher. The search module 108 may score search terms based on the behavior of the searcher to the results and profile data of the searcher, as disclosed herein. The score for a search term may be modified as more searchers interact with the results of the search. The search module 108 may generate results for a search based on a behavior score and conventional search factors, such as keywords and link density. It is to be understood that while the search module 108 is described as an integral component of a social network, the principles described herein may be applied without the search module 108 being an integral part of a social network or even necessarily utilizing data from a social network if behavior information of searchers is available from alternative sources.

As illustrated, the data layer 105 includes, but is not necessarily limited to, several databases 110, 112, 114, such as a database 110 for storing profile data 116, including both member profile data as well as profile data for various organizations. Consistent with some examples, when a person initially registers to become a member of the social network service, the person may be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 110. Similarly, when a representative of an organization initially registers the organization with the social network service, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some examples, a member may elect to "follow" another member. In contrast to establishing a connection, the concept of "following" another member typically is a uni-lateral operation, and at least with some examples, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph database 112.

Activities by users of the social network 100, including past searches that have been conducted by the search module 108, may be logged as activities 118 in the activity and behavior database 114. Such activities may include search terms, interactions with search results and subsequent engagement with the subject of search results, scores assigned to such search terms, as disclosed herein, communication with others via the social network, engagement with content items posted on the social network, joining groups, following entities, and so forth.

The social network service may provide a broad range of other applications and services that allow members the opportunity to share and receive information, often customized to the interests of the member. For example, with some examples, the social network service may include a photo sharing application that allows members to upload and share photos with other members. With some examples, members may be able to self-organize into groups, or interest groups, organized around a subject matter or topic of interest. With some examples, the social network service may host various job listings providing details of job openings with various organizations.

Although not shown, with some examples, the social network 100 provides an application programming interface (API) module via which third-party applications can access various services and data provided by the social network service. For example, using an API, a third-party application may provide a user interface and logic that enables an authorized representative of an organization to publish messages from a third-party application to various content streams maintained by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
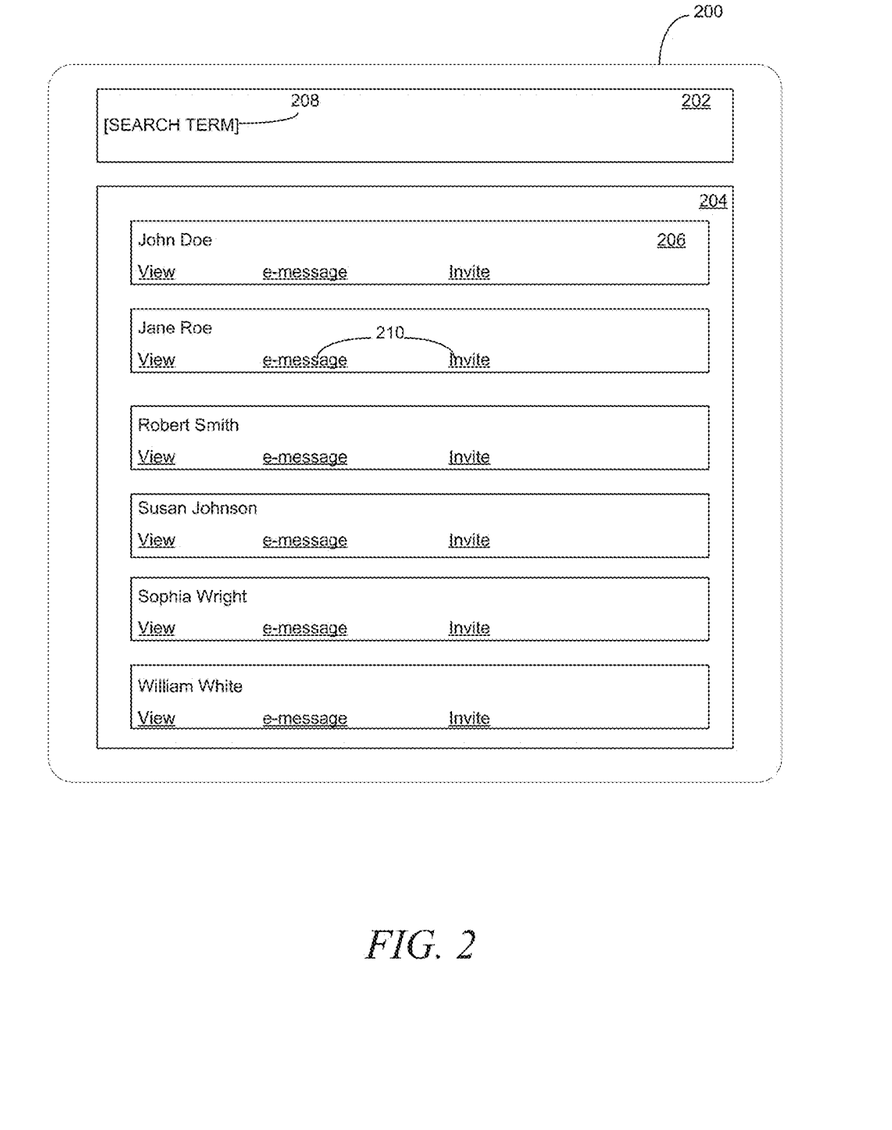
FIG. 2 is an abstract image of a search user interface of a search engine as provided by a search module, in an example embodiment.

FIG. 2 is an abstract image of a search user interface 200 of a search engine as provided by the search module 108, in an example embodiment. The user interface 200 includes a search term entry line 202 and a search results window 204 displaying individual search results 206. In various illustrative examples utilized herein, searches will be discussed with respect to a search by a recruiter of candidates for a job. However, it is to be understood that the principles described herein may be readily applicable to searches of a variety of different types of content, including webpages.

Figure 3:
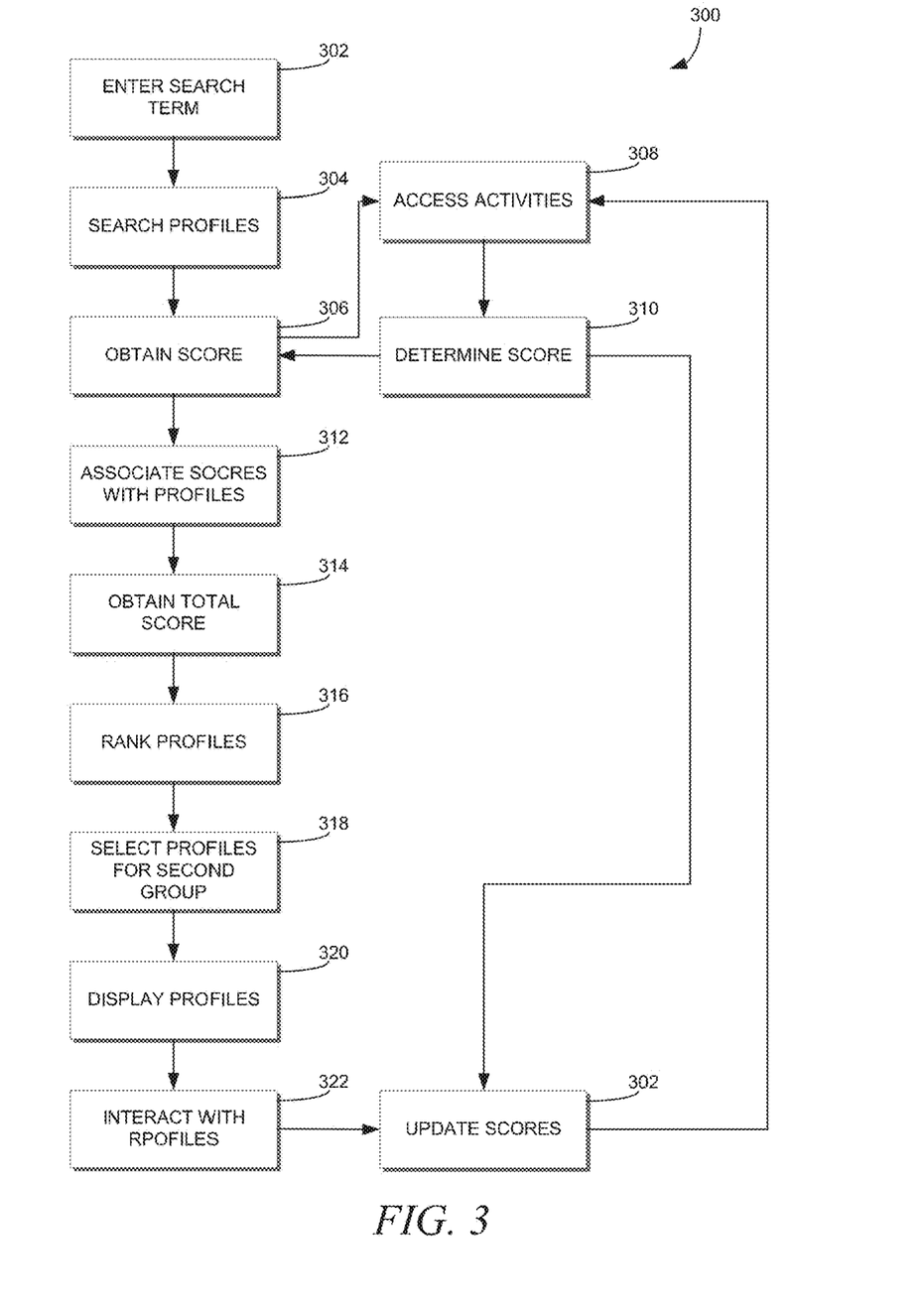
FIG. 3 is a flowchart for performing a search using a search module, in an example embodiment.

FIG. 3 is a flowchart 300 for performing a search using the search module 108, in an example embodiment. The description of the flowchart 300 will continue the description of the search user interface 200.

At 302 a search term 208 may be entered into the search term entry line 202, such as by typing, copy-pasting, and the like. The search term 208 may include one or more clauses;

for instance, a search term 208 may be "engineer" or "software engineer" or "Hadoop software engineer," and so forth.

At 304, the search module 108 searches at least some of the profiles 116 to identify profiles 116 that meet the search term 208. The search may proceed according to any of a variety of search criteria, such as keyword searches, the density of a social graph 112 corresponding to each profile 116, and so forth. The search may compare the search term against characteristics of the user from the profiles 116, the characteristics including at least some of the profile data, such as profession, current employment, previous employment, education, location, experience, and so forth, including various characteristics and profile data disclosed herein. The search may return an initial result having a predetermined number of the best results according to the basic search criteria. The predetermined number of initial results may be greater than a predetermined number of profiles 116 that may be part of the final result, for instance to allow for the selection of a subset of the initial results as the final result based on scores for the profiles 116 of the initial result.

At 306, upon receiving the initial results the search module 108 obtains a score for at least some, and in an example embodiment each of the profiles 116 of the initial results in relation to the search term 208. In various examples, the search module 108 generates the scores in the first instance based on past member activities 118, e.g., the results and interactions that were generated from previous searches that produced the profile 116 in question. Alternatively, the scores may be maintained in the member activity and behavior database 114, updated in the event of new searches and the resultant user behavior, and accessed during new searches. If, for a given search term 208, some profiles 116 of the initial results have associated scores but others do not then the profiles that do not have associated scores may have scores generated by the search module 108.

Each score may pertain to a particular profile 116 as against a previous search term or consolidation of multiple previous search terms. Thus, where the scores are stored and accessed, the member activity and behavior database 114 may store multiple scores for a single profile 116. For instance, Profile A may have a first score that pertains to the search term "software engineer", a second score that pertains to the search term "Hadoop", a third score that pertains to "cluster", and so forth.

Where a score is not available in the member activity and behavior database 114, for instance because scores are not retained and stored or because a suitable score has not been previously obtained and stored, then the score may be generated for each profile obtained relative to the search criteria.

At 308, in an example, for each profile 116 in the initial results, the search module 108 may access activities 118 in the member activity and behavior database 114 that related to the selection or non-selection of and subsequent activity related to the profile 116 in question and the search term. For instance, the activities 118 may indicate that, continuing with the above example, Profile A was returned for a previous search of "software engineer" and that the user selected Profile A for viewing but did not contact Profile A or otherwise interact with Profile A thereafter. The activities 118 may further indicate that Profile A was returned for a previous search of "Hadoop software engineer" and that the user viewed Profile A and initiated contact with Profile A via electronic message.

A relevance of an activity 118 to a particular search term may be based on keywords and related words. Thus, if the search is "Hadoop software engineer" then, in an example, any activity 118 related that matches at least one word in the search or matches one related word (as described above), may be returned for consideration by the search module 108. The standard for returning activities 118 may be varied to limit the results. Thus, in various examples, only activities 118 that have at least two matching keywords may be returned, or only a predetermined maximum number of activities 118 may be returned for each profile 116.

At 310, based on the activities 118 as provided, the search module 108 determines a score for each profile 116. The score may be determined based on the extent to which the activities 118 generated interest by the user who initiated the previous searches from which the activities were generated. For instance, the score may be generated based on a precise formula dependent on the circumstances of the search. Where the search is a recruiter search, the metrics of interaction may be (1) that a recruiter viewed the profile 116, (2) that the recruiter attempted to contact the individual associated with the profile, and (3) that the recruiter invited the individual to participate in an interview or formal hiring process. In an example, each of the above stages may be scored as one point or may be differing point values (e.g., viewing may be worth one point, attempted contact may be worth two points, and so forth). The points may be cumulative, so an activity or activities 118 that indicated that the profile 116, when it was previously displayed as a result of a particular search, was viewed, contacted, and interviewed may be worth six points.

At 312, the obtained scores associated with the profiles 116 and activities 118 related to previous searches may be weighted depending on a degree of relatedness to the search term 208 as entered in the search term entry line 202. Scores that derive from search terms from previous activities 118 that are substantially the same as the search term 208 may be weighted at or near 1.0. Scores that drive from search terms that include some elements but not all of the search term 208 as entered may be weighted less.

The software module 108 may identify the extent to which search terms 208 as entered relate to search terms from stored activities 118. For instance, if previous search terms have included "Hadoop software engineer" and "Hadoop search engineer", and users who have entered such search terms have selected the same or similar items from the search results (e.g., the commonality of the job candidates as selected by the two recruiters is within a predetermined limit), then the two search terms may be deemed equivalent or effectively equivalent.

If a search term include some but not all of the same or related keywords as the search term 208 then the search module 108 may weight the scoring of the search results accordingly. Thus, if a score is possessed for "software engineer" but not "Hadoop software engineer" as entered in the search term entry line 202, then the score for "software engineer" may be weighted, in an example by 0.667. Relatedness may be determined based on the content items to be searched; for instance if "Hadoop" routinely appears with "software engineer" in profiles 116 and activities 118 then "Hadoop engineer" may be determined to be closely related with "Hadoop software engineer", and thus have a high weighting factor, and a subset of "software engineer", and thus have a lower weighting factor.

Scores may further be weighted according to factors not necessarily related to the search term 208. In various examples, factors that may be relevant to a reputation of the profile 116 associated with the score or other actors, such as the reputation of the user who accessed the profile 116 in a previous search, may similarly be incorporated in the weighting of each score. Reputational factors for both the user and the profile 116 in question may include profile data from the profile database 110, density of the associated social graph 112, and data from the behavior and activities database 114.

In an example, if a previous recruiter received a profile 116 in a previous search and viewed, contacted, and/or interviewed the profile 116 and the associated individual, then the reputation of either or both of the recruiter and the individual/profile 116 may weight the resultant score. For instance, if the recruiter is a recruiter is from a well-known or large company or recruiting agency, then the score may be weighted higher than if the recruiter worked for a little-known or small company or recruiting agency. Such information may be available in the profile database. If the recruiter had a relatively large social graph 112 then the score may be weighted higher than if the recruiter had a relatively small social graph 112. If the recruiter was a relatively active recruiter, having had relatively large numbers of searches, profile 116 views, communications, and interviews, then the score may be weighted higher than if the recruiter was relatively inactive.

The same principles may be applied to the profile 116 in question. For instance, if the profile 116 is for an executive or an employee at a well-known or prestigious company or agency then the score may be weighted higher than if the profile 116 is for a relatively low-level employee or an employee at a relatively little-known company or agency. If the profile 116 or associated individual had a relatively large social graph 112 then the score may be weighted higher than if the profile 116 had a relatively small social graph 112. If the profile 116 corresponding to an individual who had activities 118 indicating that the individual had been actively recruited by other recruiters then the score may be weighted more heavily than a profile 116 that had been recruited lightly or not at all. The principles described here apply as well to situations outside of recruitment.

Score weighting for reputation may be based on absolute or relatively levels. For instance, a recruiter or profile 116 with more than one thousand connections may be considered to have a large social graph 112 and the score may be weighted by a predetermined amount, such as a fifty percent increase. A recruiter or profile 116 corresponding to a company or agency in the top quartile in terms of revenue, profit, number of references to the company or agency in the social network 100 over a given time period, number of employees, and so forth may be considered a well-known or prestigious company or agency and the score weighted with a predetermined amount. A recruiter or profile 116 that had recruited or been recruited more than a predetermined number of times over a predetermined timeframe may be "active" or sought after and thus weighted by a predetermined amount. Thresholds on the low ends of those scales may be utilized as well to weight the score negatively, while values between the thresholds Alternatively, weighting may be based on relative factors. For instance, if a recruiter or profile 116 has a social graph 112 that is within one standard deviation of the median social graph 112 size throughout the social network 110 then the social graph may not be weighted at all. If the social graph 112 is more than one standard deviation higher or lower than the mean but less than two standard deviations then the score may be weighted by a first amount, such as twenty-five percent. If the social graph 112 is more than two standard deviations higher or lower than the mean but less than three standard deviations then the score may be weighted by a second amount, such as fifth percent, and so forth. The same principles may be applied to the other factors.

At 314, for each profile 116, individual scores may be used to obtain a total score that may be cumulative across all activities 118 for the profile 116 in question. Thus, if one search resulted in three points, a second search resulted in no points, and a third search resulted in six points, the profile 116 may have a score of nine points. Alternatively, a score for a profile may be an average or other mathematical or statistical relationship for the each of the discrete searches. As such, in the above example, the profile 116 in question may have a score of three, i.e., the average of zero, three, and six points.

At 316, upon receiving the cumulative score for each profile 116 as identified in the initial search results, the profiles 116 are optionally ranked according to their cumulative scores. In an example, the ranking is from highest to lowest cumulative score. As such, the mathematical operation by which the cumulative scores were obtained may define the nature of the subsequent rankings. Cumulative scores that are based on total points may benefit profiles 116 that have relatively large amounts of pervious activity. Cumulative scores that are based on average may benefit profiles 116 that have more "quality" activities 118, e.g., by being the profiles 116 that have elicited the most interest in the past. Alternatively, profiles 116 may be ranked from lowest to highest, for instance to promote profiles 116 that have been overlooked in the past or are new to the social network 100.

At 318, at least some of the initial group of profiles 116 are selected as the second group or final group of profiles 116. In an example, fewer profiles 116 are in the second group of profiles than are in the first group of profiles. In an example, a predetermined number of the highest-ranked profiles 116 of the first group are selected for the final group. In an example, any profile 116 with a cumulative score higher than a predetermined threshold is selected for the final group.

At 320, at least some of the profiles 116 of the final group of profiles are displayed in the search results window 204. The profiles 116 may be displayed according to their rank within the final group of profiles. The search results window 204 may scroll to display more profiles 116 than may be displayed at any one time in the window 204.

At 322, the user may interact with the profiles 116 as displayed in the search results window 204 by using links 210. The interactions may be of the sort described above, including viewing the profiles 116, communicating with individuals associated with the profiles 116, and inviting the individuals to participate in an interview or other recruiting process. Such interactions may be stored as individual or collections of activities 118 in the member activity and behavior database 114. For instance, each time the recruiter views a profile 116 may be stored as a separate activity 118 and each time the recruiter communicates with an individual may be stored as a separate activity 118 and so forth. Alternatively, interactions with a single profile 116 may be consolidated into a single activity 118. Thus, that the recruiter viewed a profile 116, communicated with the individual, and invited the individual to a formal interview may all be saved in a single activity 118.

At 324, if scores are saved in the member activity and behavior database 114, the scores may be updated in the manner described above with respect to 312 and 314. A new score may be calculated, associated with the search term 208 and stored. A cumulative score may be updated and stored.

Figure 4A:
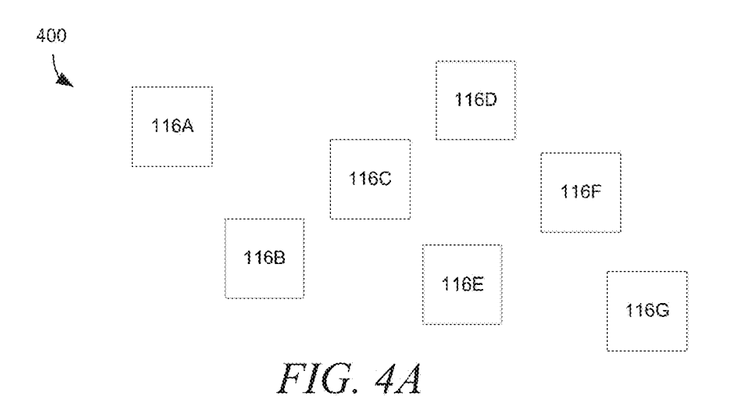
FIGS. 4A-4C is an illustration of the forming of first and second groups of profiles, in an example embodiment.
Figure 4B:
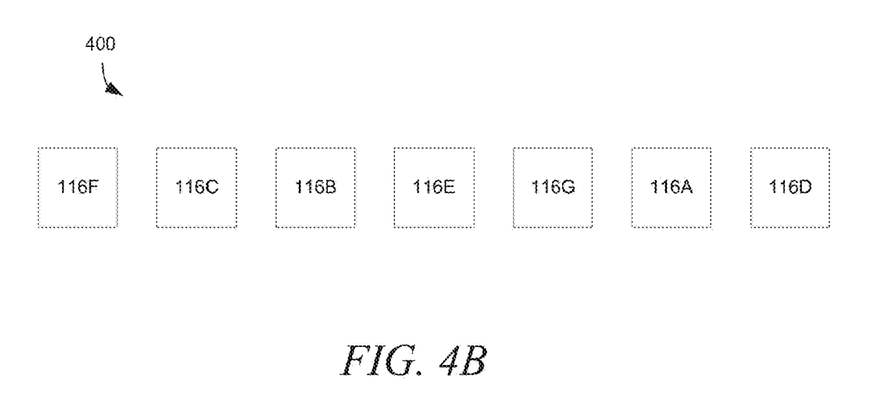
Figure 4C:
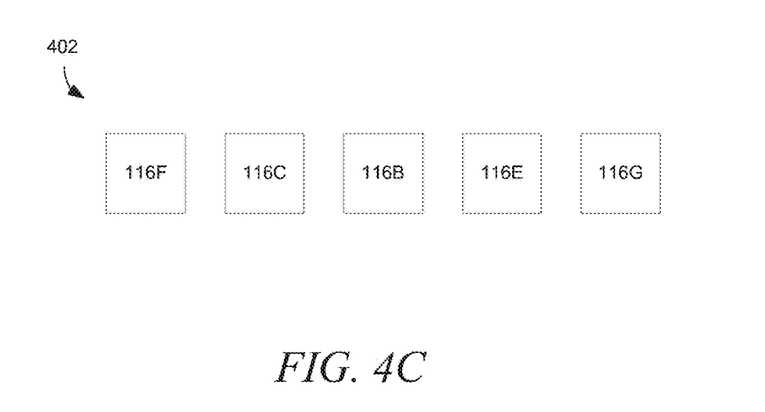

FIGS. 4A-4C is an illustration of the forming of the first and second groups of profiles 116, in an example embodiment. In FIG. 4A, the first group 400 includes profiles 116A-116G that match the search term 208 according to various search criteria. The search criteria may be conventional search criteria as described herein, such as keywords. In FIG. 4A the first group 400 may be essentially unordered or may be ordered according to a relevance to the search term 208 or other conventional search factor.

In FIG. 4B, following the search module 108 obtaining scores for each of the profiles 116 of the first group 400, the profiles 116 of the first group are ordered according to the rank of the scores of each of the profiles 116. In FIG. 4C, a subset of the profiles 116 of the first group 400 are formed into the second group 402. As noted herein, the second group 402 may be formed by taking the highest-scored profiles 116 up to a predetermined maximum or by taking some or all of the profiles 116 having a score higher than a predetermined threshold score. The profiles 116 of the second group 402 may then be displayed on the search interface 200.

Flowchart

Figure 5:
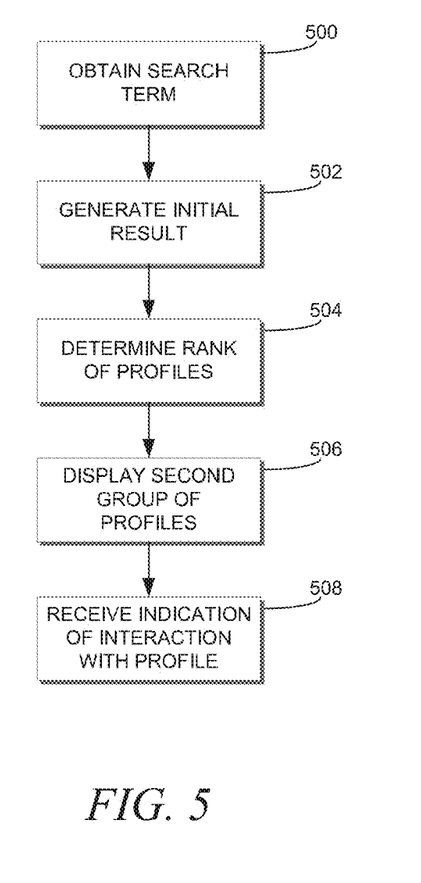
FIG. 5 is a flowchart for behavior-influenced search ranking, in an example embodiment.

FIG. 5 is a flowchart for behavior-influenced search ranking, in an example embodiment. The flowchart may be performed with any of a variety of devices and systems disclosed herein, as well as with any suitable system known in the art.

At operation 500, a search term is obtained from a user device via a network interface.

At operation 502, an initial result including a first group of the user profiles is generated, with a processor, based on user profiles from a social network in relation to the search term, the user profiles being stored in a profile database. In an example, at least some of the user profiles individually correspond to a different one of a plurality of users and each user profile includes a characteristic of the one of the plurality of users that corresponds to the user profile. In an example, generating the initial result is based on the comparison of the characteristic of the user profiles to the search term.

At operation 504, a rank of each of the first group of the user profiles is determined with the processor based, at least in part, on interactions from an activity database corresponding to the first group of the user profiles, the activity database storing information indicative of activities related to the social network, the activities including the interactions. In an example, the interactions include a selection of one of the user profiles, a message sent to an entity corresponding to the user profile, and an invitation sent to the entity corresponding to the user profile. In an example, the activities are interactions that occurred, at least in part, prior to obtaining the search term. In an example, the user profiles include user profiles related to users who conducted individual ones of the activities wherein ranking the user profiles of the first group is according to the user profiles of the users who conducted corresponding individual ones of the activities.

In an example, determining the rank of each of the first group of the user profiles is further based, at least in part, on a social graph stored in social graph database, the social graph being indicative of social network connections between at least some of the user profiles. In an example, each of at least some of the first group of user profiles have a social graph density based on a number of connections of each one of the at least some of the first group of user profiles and other user profiles and wherein determining the rank is based on the social graph density.

At operation 506, the user device is caused to display a second group of the user profiles, including at least some of the first group of the user profiles, according to the rank of the first group of the user profiles. In an example, causing the user device to display the second group of user profiles permits interaction with individual ones of the user profiles of the second group, the interaction including at least one of viewing the user profile, sending a message sent to an entity corresponding to the user profile, and sending an invitation to the entity corresponding to the user profile.

At operation 508, an indication of the interaction is received from the user device and information indicative of the interaction is stored in the activities database.

System

Figure 6:
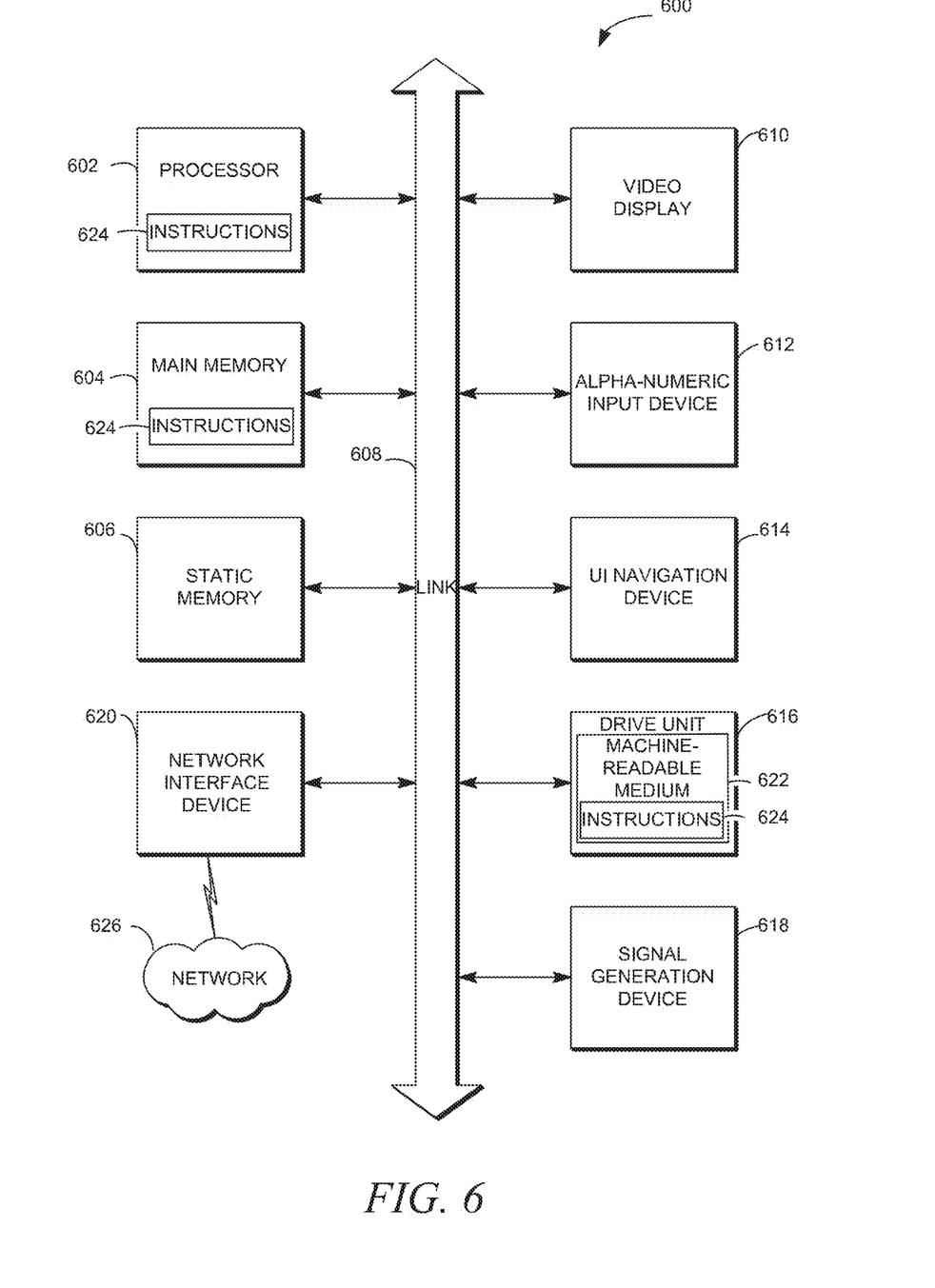
FIG. 6 is a block diagram illustrating components of a machine able to read instructions from a machine-readable medium.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system and within which instructions 624 (e.g., software) for causing the machine 600 to perform any one or more of the methodologies discussed herein may be executed. In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a graphics display 610 (e.g., a plasma display panel (PDP), a light emitting diode (LED) display, a liquid crystal display (LCD), a projector, or a cathode ray tube (CRT)). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a machine-readable medium 622 on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 via the network interface device 620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 600), such that the instructions, when executed by one or more processors of the machine (e.g., processor 602), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method, comprising:
    obtaining, via a network interface, a search term from a user device of a user;
    generating, with a processor, based on user profiles from an online social network system in relation to the search term, an initial result including a first group of the user profiles, the user profiles stored in a profile database of the online social network system;
    for each of the users in the first group, identifying, with the processor, past instances in which that user has come up in a search result;
    for each of the users in the first group, determining, with the processor, a rate at which that user has had interactions resulting from the past search results;
    determining, with the processor, a rank of each of the first group of the user profiles obtained via the search term, based on the rate; and
    causing the user device to display a second group of the user profiles, different than the first group of the user profiles but including at least some of the first group of the user profiles, according to the rank of the first group of the user profiles.

2. The method of claim 1, wherein the interactions include a selection of one of the user profiles, a message sent to an entity corresponding to the user profile, and an invitation sent to the entity corresponding to the user profile.

3. The method of claim 2, wherein the activities are interactions that occurred, at least in part, prior to obtaining the search term.

4. The method of claim 1, wherein determining the rank of each of the first group of the user profiles is further based, at least in part, on a social graph stored in social graph database, the social graph being indicative of social network connections between at least some of the user profiles.

5. The method of claim 4, wherein each of at least some of the first group of user profiles have a social graph density based on a number of connections of each one of the at least some of the first group of user profiles and other user profiles and wherein determining the rank is based on the social graph density.

6. The method of claim 1, wherein at least some of the user profiles individually correspond to a different one of a plurality of users and wherein each user profile includes a characteristic of the one of the plurality of users that corresponds to the user profile.

7. A non-transitory computer readable medium instructions that, when executed on a processor, cause the processor to implement operations comprising:
    obtaining, via a network interface, a search term from a user device of a user;
    generating based on user profiles from an online social network system in relation to the search term, an initial result including a first group of the user profiles, the user profiles stored in a profile database of the online social network system;
    for each of the users in the first group, identifying past instances in which that user has come up in a search result;
    for each of the users in the first group, determining a rate at which that user has had interactions resulting from the past search results;
    determining a rank of each of the first group of the user profiles obtained via the search term, based on the rate; and
    causing the user device to display a second group of the user profiles, different than the first group of the user profiles but including at least some of the first group of the user profiles, according to the rank of the first group of the user profiles.

8. The computer readable medium of claim 7, wherein the interactions include a selection of one of the user profiles, a message sent to an entity corresponding to the user profile, and an invitation sent to the entity corresponding to the user profile.

9. The computer readable medium of claim 8, wherein the activities are interactions that occurred, at least in part, prior to obtaining the search term.

10. The computer readable medium of claim 7, wherein the instructions further cause the processor to determine the rank of each of the first group of the user profiles further based, at least in part, on a social graph stored in social graph database, the social graph being indicative of social network connections between at least some of the user profiles.

11. The computer readable medium of claim 10, wherein each of at least some of the first group of user profiles have a social graph density based on a number of connections of each one of the at least some of the first group of user profiles and other user profiles and wherein determining the rank is based on the social graph density.

12. The computer readable medium of claim 7, wherein at least some of the user profiles individually correspond to a different one of a plurality of users and wherein each user profile includes a characteristic of the one of the plurality of users that corresponds to the user profile.

13. A system, comprising:
a non-transitory computer readable medium comprising instructions that, when executed on a processor, cause the processor to implement operations comprising:
obtaining, via a network interface, a search term from a user device of a user;
generating based on user profiles from an online social network system in relation to the search term, an initial result including a first group of the user profiles, the user profiles stored in a profile database of the online social network system;
for each of the users in the first group, identifying past instances in which that user has come up in a search result;
for each of the users in the first group, determining a rate at which that user has had interactions resulting from the past search results;
determining a rank of each of the first group of the user profiles obtained via the search term, based on the rate; and
causing the user device to display a second group of the user profiles, different than the first group of the user profiles but including at least some of the first group of the user profiles, according to the rank of the first group of the user profiles.

14. The system of claim 13, wherein the interactions include a selection of one of the user profiles, a message sent to an entity corresponding to the user profile, and an invitation sent to the entity corresponding to the user profile.

15. The system of claim 14, wherein the activities are interactions that occurred, at least in part, prior to obtaining the search term.

16. The system of claim 13, wherein the instructions further cause the processor to determine the rank of each of the first group of the user profiles further based, at least in part, on a social graph stored in social graph database, the social graph being indicative of social network connections between at least some of the user profiles.

17. The system of claim 16, wherein each of at least some of the first group of user profiles have a social graph density based on a number of connections of each one of the at least some of the first group of user profiles and other user profiles and wherein determining the rank is based on the social graph density.

18. The system of claim 13, wherein the user profiles further comprise a user profile of a previous user who previously accessed at least one of the first group of user profiles from a prior search, and wherein the computer readable medium further comprises instructions that cause the processor determine the rank of each of the first group of the user profiles based, at least in part, on the user profile of the previous user.

19. The method of claim 1, wherein the user profiles further comprise a user profile of a previous user who previously accessed at least one of the first group of user profiles from a prior search, and wherein the determining the rank of each of the first group of the user profiles is further based, at least in part, on the user profile of the previous user.

20. The computer readable medium of claim 7, wherein the user profiles further comprise a user profile of a previous user who previously accessed at least one of the first group of user profiles from a prior search, and wherein the computer readable medium further comprises instructions that cause the processor determine the rank of each of the first group of the user profiles based, at least in part, on the user profile of the previous user.

\* \* \* \* \*

UNITED STATES PATENT AND TRADEMARK OFFICE
CERTIFICATE OF CORRECTION

PATENT NO. : 10,387,509 B2
APPLICATION NO. : 14/581159
DATED : August 20, 2019
INVENTOR(S) : Asif Mansoor Ali Makhani It is certified that error appears in the above-identified patent and that said Letters Patent is hereby corrected as shown below:

In the Claims

In Column 14, Line 30, in Claim 7, after "medium", insert --comprising--

Signed and Sealed this
Twentieth Day of October, 2020

Andrei Iancu
*Director of the United States Patent and Trademark Office*